Patented Jan. 25, 1949

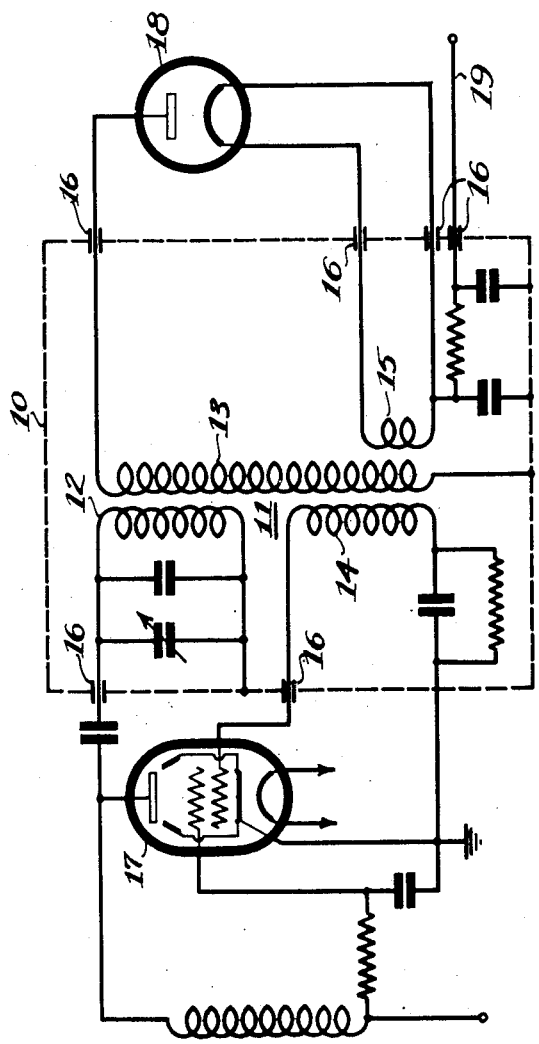

2,459,988

UNITED STATES PATENT OFFICE 2,459,988

RADIO-FREQUENCY OSCILLATOR POWER SUPPLY CIRCUITS

Ronald Dean Boadle, Sydney, New South Wales, Australia, assignor to Amalgamated Wireless (Australasia) Limited, Sydney, New South Wales, Australia, a company of New South Wales Application June 12, 1945, Serial No. 598,999
In Australia August 22, 1944

6 Claims. (Cl. 175—363)

This invention relates to a direct current supply source of the radio frequency oscillator type and more particularly to means for reducing the physical dimensions of such apparatus and for rendering same impervious to climatic changes without affecting the operating characteristics.

R. F. oscillator power supply circuits of the tuned step-up transformer type are well known, having been previously described in Australian Patent 116,610, in application Serial No. 118,878, now Patent No. 2,139,826, granted December 13, 1938, and also in Proceedings of the Institute of Radio Engineers, April 1943, pages 158–163.

The operation of cathode-ray tubes for television requires high-potential direct-current sources, ranging in voltage from less than 1 kilovolt for iconoscopes to 30 kilovolts and higher for projection kinescopes.

The conventional high-voltage supply consists of an iron-core step-up transformer energized from the 60-cycle power line, and a rectifier circuit with smoothing filter. Mechanical and insulation problems make it difficult to construct small 60 cycle transformers with tightly packed windings for voltages exceeding approximately 5 kilovolts. Practical transformers, therefore, are relatively large and heavy and can furnish currents considerably in excess of the usual requirements.

The use of high-frequency power sources permits a substantial reduction in transformer inductance and results in a relatively simple transformer construction. The input power is generated by vacuum-tube oscillators, which automatically limit the possible power output. This characteristic and the low-energy storage in the small smoothing reactances permit the construction of safe supplies provided the current requirements are not too high.

Generators of this type feature a high voltage power supply circuit of good regulation, compactness and light weight; the circuit having particular utility in supplying operating potential to the high potential electrodes of cathode ray tubes.

The predominant disadvantage in present-day radio frequency power supply arrangements is that, even though there is provided a high tension power supply unit of smaller dimensions than conventional types which use iron cored step-up transformers together with associated rectifier and smoothing components, the dimensions are still such as to prohibit inclusion on the same chassis as the load supplied therefrom.

Because of this the power supply equipment is generally mounted either in a separate unit or on a separate chassis where a rack mounted assembly is employed.

This separation of the power supply unit from the load circuit which it supplies necessitates the use of lengthy high tension connectors, suitable plugs, and terminal panels which require added space.

Where equipment of this type is employed in humid atmosphere such as in tropical climates, considerable trouble is experienced due to failure of the apparatus through breakdown of the insulation of components or connections in the high voltage circuit. Every extension of the high voltage leads around the apparatus increases the vulnerability to climatic deterioration, damage and danger to operating personnel.

The principal object of the present invention is to provide a high voltage supply unit of the type referred to, which is small enough to be placed immediately adjacent the high tension load and yet which is constructed in such a manner that it can withstand severe climatic conditions without deterioration in performance.

The above object is achieved, in accordance with this invention, by impregnating and immersing the oscillatory and high voltage circuit components of a radio frequency power supply circuit, with the exception of the oscillator and rectifier valves, in a sealed oil-filled container.

In carrying the invention into practical effect the selected radio frequency and high voltage circuit components are impregnated with oil by immersion in an oil-filled sealed container which latter preferably comprises a metal tank thereby to avoid the necessity of providing additional screening.

The tank is evacuated to a pressure of one millimeter of mercury or less (the highest vacuum that can be easily obtained is desirable), to remove moisture from the enclosed components and also air from mica condensers.

The oil itself, prior to being allowed to flood the tank, is preferably filtered and then dried by the application of vacuum.

With the tank under vacuum, it is filled with oil, following which the pressure is released to permit rapid penetration of oil into the coil and condenser components of the high frequency circuit enclosed within said tank. The oil filled tank is then heated to expand the oil, causing some overflow, at which stage the filling hole for the tank is solder-sealed.

The increase in the insulation and heat radiating properties of the circuit, consequent upon the above stated impregnation and oil immersion of components, permits the realization of many desirable improvements in this type of apparatus.

Thus, for any given high voltage requirement coils of smaller physical dimensions, wound with smaller wire and with closer spacing between turns, may be used. Closer coupling may be employed between adjacent coils and components without fear of flash-over thereby attaining a more compact assembly. Condensers of smaller voltage rating may be used throughout.

Standard types of rectifier valves may be used instead of special types as heretofore. This latter advantage arises from the fact that the improvement in insulation permits tighter coupling between the rectifier filament coil and the oscillator coil thereby providing the desired increased amount of radio frequency power for the heating of standard rectifier filaments.

A metal container obviates the necessity for additional shielding equipment as such a contained effectively shields the radio frequency circuit from associated apparatus.

It is well known that to maintain the circuit efficiency at high value the extraneous capacities across the secondary winding of a tuned step-up transformer should be kept as low as possible. This objective may be achieved, in the performance of the present invention, by the use of either glass or ceramic solder seal insulator bushings for conductors passing through the walls of the container.

This type of bushing offers two advantages; it facilitates obtainment of efficient oil-tight seals and permits the use of low capacity insulators.

Where minimum capacity is necessary or desirable the conductor passing through the bushing may be made of the finest wire it is practicable to use.

The accompanying single figure of drawing indicates, in diagrammatic form, an exemplary arrangement embodying the subject invention.

In this drawing, the dotted outline 10 represents a sealed, oil-filled metal container enclosing a transformer 11 comprising condenser-shunted primary winding 12, secondary winding 13, feedback winding 14 and filament winding 15. The container 10 also encloses incidental circuit wiring and other conventional capacitor and resistor elements.

Where necessary leads, associated with above-mentioned windings and/or circuit elements, pass through the walls of container 10; insulation for the leads is provided by means of ceramic solder-seal bushes 16.

Reference characters 17, 18 and 19 identify an oscillator tube, a rectifier tube and a load supply lead, respectively.

The operation of the illustrated circuit arrangement is well known to those skilled in the art and accordingly a more detailed description herein is deemed unnecessary.

From the foregoing it will be seen that enclosure of selected components, i. e. all except the oscillator and rectifier valves 17, 18 and certain minor circuit components of lesser importance, within a common sealed receptacle, and then impregnating and immersing the selected components in oil under vacuum, facilitates the production of a high voltage power supply unit of considerably reduced physical dimensions.

It will also be appreciated that size of the component parts for any given voltage requirement is dependent upon the degree of impregnation. If the size of component parts is increased less elaborate methods of impregnation are required.

Furthermore, the impregnation and immersion in oil of all high tension wiring of the circuit, except the single high tension lead 19 from the output terminal of the high tension supply to the high tension terminal of the load it supplies, together with the reduced physical dimensions of the power supply unit, enables said unit to be placed very close to the load served thereby, thus requiring only a single load lead 19 about six inches long. In this case the only source of leakage is the one and only high tension insulator on the D. C. side; vulnerability to climatic conditions therefore is considerably reduced.

What I claim is:

1. A radio frequency high voltage power supply device comprising an input and an output circuit, a metallic oil filled container located between said input and output circuits, a plurality of insulated connection terminals passing through some of the walls of said container, a high voltage radio frequency step-up transformer located within said container, said step-up transformer having a primary winding, a secondary winding, a filament winding, and a feedback winding; a plurality of resistance elements located within said container, one of said resistance elements having electrical connections made to one side of the filament winding of said transformer, a plurality of condenser elements located within said container, some of said condenser elements being electrically connected in shunt with the primary winding of said transformer, the primary winding of said transformer being electrically connected to said input circuit through one of said insulated connection terminals, others of said condensers and resistance elements being connected to one side of the feedback winding of said transformer, and others of said condensers being connected to the same side of the filament winding of said transformer as the one to which said resistance element is connected, the output circuit from said secondary winding of said transformer being electrically connected to an external rectifier to form the output portion of the high voltage supply source.

2. A radio frequency high voltage supply device according to claim 1, wherein the oil filling within said container is maintained below atmospheric pressure.

3. A radio frequency high voltage supply source according to claim 1, wherein the insulated connection terminals passing through the walls of the container are in the form of soldered, sealed ceramic bushings which make connection from the transformer, capacitive and resistive elements to an outside source.

4. A radio frequency high voltage supply device comprising a radio frequency high voltage step-up transformer having a primary coil, a secondary coil, a filament coil, and a feedback coil; a metallic oil filled container and shielding member for enclosing said transformer; a plurality of condensers within said container, some of said condensers being connected in shunt with the primary coil, others of said condensers being connected to one side of said feedback coil, and others to one side of said filament coil; a plurality of resistance elements within said container, some of said resistance elements being connected to said feedback coil and others of said resistance elements being connected to said filament coil;

a plurality of insulating bushings passing through the walls of said container; an oscillator located outside of said container; a rectifier located outside of said container; circuit connections from one element of said oscillator to said primary coil passing through one of said insulating bushings; a connection from another element of the oscillator passing through another one of said insulating bushings to said feedback coil; a connection from said secondary coil to an element of said rectifier passing through others of said insulating bushings; and a pair of connections from said filament coil to another element of said rectifier passing through others of said insulating bushings.

5. A radio frequency high voltage supply device comprising an alternating current input circuit and a direct current output circuit, an oscillator connected to said alternating current input circuit, a rectifier connected to said direct current output circuit, an oil filled metallic container located between said oscillator and said rectifier, a high voltage step-up transformer located within said container, said transformer having a primary coil, a secondary coil, a filament coil, and a feedback coil, a plurality of condensers within said container, some of said condensers being connected in shunt with the primary coil, others of said condensers being connected to one side of said feedback coil, and others to one side of said filament coil, a plurality of resistance elements within said container, some of said resistance elements being connected to one side of said feedback coil and others of said resistance elements being connected to one side of said filament coil, a plurality of insulating bushings passing through some of the walls of said container, an oscillator tube located outside of said container, circuit connections from one element of said oscillator to said primary coil passing through one of said insulating bushings, a connection from another element of the oscillator passing through another one of said insulating bushings to said feedback coil, a connection from said secondary coil to an element of said rectifier passing through others of said insulating bushings, and a pair of connections from said filament coil to another element of said rectifier passing through others of said insulating bushings.

6. A radio frequency high voltage supply device comprising an input circuit including an oscillator, an output circuit including a rectifier, a radio frequency high voltage step up transformer having a primary coil, a secondary coil, a filament coil, and a feedback coil; a metallic oil filled container and shielding member for enclosing said transformer; a plurality of condensers within said container, some of said condensers being connected in shunt with said primary coil, others of said condensers being connected to one side of said feedback coil, others of said condensers being connected to one side of said filament coil; one end of said primary winding and one side of said condensers being connected to a wall of said metallic container; one end of said secondary coil being connected to a wall of said container, one end of said feedback coil being connected to a wall of said container; a plurality of insulating bushings passing through the walls of said container, the other end of said primary winding having a connection passing through one of said insulating bushings to an element of said oscillator, the other end of said feedback coil having a connection passing through another one of said insulating bushings to an element of said oscillator, the other end of said secondary coil passing through another bushing and being connected to an element of said rectifier, and a pair of connection leads from said filament coil passing through a pair of insulating bushings to another element of said rectifier tube; a plurality of resistance elements within said container, one of said resistance elements being connected to said feedback coil which is connected to the wall of said container, another one of said resistance elements being connected to one side of the filament coil; and connection leads from said condenser elements to one side of said metallic casing.

RONALD DEAN BOADLE.

REFERENCES CITED

The following references are of record in the file of this patent:

UNITED STATES PATENTS

| Number | Name | Date |
|---|---|---|
| 867,579 | Gerard | Oct. 8, 1907 |
| 1,645,215 | Baver | Oct. 11, 1927 |
| 1,682,730 | Waite | Aug. 28, 1928 |
| 1,709,866 | Mutscheller | Apr. 23, 1929 |
| 2,120,002 | Rorden | June 7, 1938 |
| 2,210,699 | Bahls | Aug. 6, 1940 |
| 2,246,318 | Putman | June 17, 1941 |